US012637938B2

(12) United States Patent
Ocegueda-Hernandez et al.

(10) Patent No.: US 12,637,938 B2
(45) Date of Patent: May 26, 2026

(54) INTELLIGENT MONITORING FOR DRILLING PROCESS AUTOMATION

(71) Applicant: National Oilwell Varco, L.P., Houston, TX (US)

(72) Inventors: Francisco Ocegueda-Hernandez, Houston, TX (US); Christopher P. Mullin, Dallas, TX (US); Ryan J. Hanford, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 280 days.

(21) Appl. No.: 16/391,885

(22) Filed: Apr. 23, 2019

(65) Prior Publication Data

US 2019/0345810 A1 Nov. 14, 2019

Related U.S. Application Data

(60) Provisional application No. 62/671,290, filed on May 14, 2018.

(51) Int. Cl.
E21B 44/02 (2006.01)
E21B 44/00 (2006.01)
(Continued)

(52) U.S. Cl.
CPC ............ E21B 44/02 (2013.01); G05B 13/042 (2013.01); G06F 9/4881 (2013.01); G06F 9/541 (2013.01);
(Continued)

(58) Field of Classification Search
CPC ... G05B 13/042; E21B 2200/22; E21B 44/00; E21B 44/02; E21B 2200/20;
(Continued)

(56) References Cited

U.S. PATENT DOCUMENTS 5,448,911 A 9/1995 Mason
8,256,534 B2 9/2012 Byreddy et al.
(Continued)

FOREIGN PATENT DOCUMENTS

CA 2700258 C 11/2012
GB 2518282 B 12/2015
(Continued)

OTHER PUBLICATIONS

Zhao, Machine Learning-Based Trigger Detection of Drilling Events Based on Drilling Data, 2017 (Year: 2017).*
(Continued)

*Primary Examiner* — Michael Edward Cocchi
(74) *Attorney, Agent, or Firm* — Blank Rome LLP

(57) ABSTRACT

Optimizing performance of an automated control system for drilling may include obtaining instructions to deploy a plurality of event-driven drilling activities comprising a drilling process, obtaining default parameters for a first instance of a first activity of the event-driven drilling activities, deploying the first activity of the drilling activities using the default parameters, comprising performing signal analysis on signal data from one or more sensors utilized for the first activity. Optimizing performance of an automated control system for drilling may also include detecting a trigger for a first instance of a second activity using the default parameters, and determining a trigger signature based on the signal analysis when the trigger for the first instance of the second activity is detected, wherein, when a second instance of the first activity is deployed, the trigger signature is utilized to trigger the deployment of a second instance of the second activity.

18 Claims, 7 Drawing Sheets

(51) Int. Cl.
*G05B 13/04* (2006.01)
*G06F 9/48* (2006.01)
*G06F 9/54* (2006.01)

(52) U.S. Cl.
CPC .............. *G06F 9/542* (2013.01); *E21B 44/00* (2013.01); *E21B 2200/20* (2020.05); *E21B 2200/22* (2020.05)

(58) Field of Classification Search
CPC ........ E21B 44/005; E21B 44/10; E21B 33/00; G06F 9/4881; G06F 9/541; G06F 9/542; G06F 30/20; G06F 30/25; G06F 30/27; G06F 30/28
See application file for complete search history.

(56) References Cited

U.S. PATENT DOCUMENTS

| | | | |
|---|---|---|---|
| 2012/0118637 A1* | 5/2012 | Wang | E21B 44/00 700/29 |
| 2012/0123756 A1 | 5/2012 | Wang et al. | |
| 2013/0032407 A1 | 2/2013 | Edbury | |
| 2013/0146359 A1* | 6/2013 | Koederitz | E21B 21/08 175/48 |
| 2013/0161096 A1* | 6/2013 | Benson | E21B 7/04 175/26 |
| 2013/0231787 A1* | 9/2013 | Chapman | E21B 44/00 700/282 |
| 2014/0291023 A1 | 10/2014 | Edbury | |
| 2014/0326509 A1 | 11/2014 | Hay | |
| 2015/0053482 A1 | 2/2015 | Boone | |
| 2015/0088468 A1 | 3/2015 | Hohl | |
| 2015/0112949 A1 | 4/2015 | Marland | |
| 2015/0345223 A1 | 12/2015 | Maidla | |
| 2016/0177699 A1 | 6/2016 | Benson et al. | |
| 2016/0265336 A1 | 9/2016 | Benson et al. | |
| 2017/0152741 A1 | 6/2017 | Park | |
| 2017/0370191 A1* | 12/2017 | Fox | G06Q 10/06 |
| 2018/0135402 A1 | 5/2018 | Jeffryes | |
| 2019/0284924 A1* | 9/2019 | Zhao | E21B 44/00 |

FOREIGN PATENT DOCUMENTS

| | | | | |
|---|---|---|---|---|
| WO | WO-2013130440 A1 * | 9/2013 | ............ | E21B 44/00 |
| WO | 2016019077 A1 | 2/2016 | | |
| WO | 2016162659 A1 | 10/2016 | | |
| WO | 2016176428 A1 | 11/2016 | | |
| WO | 2017116474 A1 | 7/2017 | | |
| WO | 2017171557 A1 | 10/2017 | | |
| WO | WO-2018029454 A1 * | 2/2018 | .............. | G06F 9/54 |

OTHER PUBLICATIONS

Cayeux, Eric, Benoît Daireaux, and Erik Wolden Dvergsnes. "Automation of drawworks and topdrive management to minimize swab/surge and poor-downhole-condition effects." SPE Drilling & Completion 26.04 (2011): 557-568. (Year: 2011).*

Cayeux, E.. , Daireaux, B.. , Dvergsnes, E.W.. W., and F.. Florence. "Toward Drilling Automation: On the Necessity of Using Sensors That Relate to Physical Models." SPE Drill & Compl 29 (2014): 236-255. (Year: 2014).*

International Search Report and Written Report received in PCT Application No. PCT/US2018/056791, mailed Jan. 15, 2019.

International Search Report and Written Report received in PCT Application No. PCT/US2019/028701, mailed Aug. 5, 2019.

International Search Report and Written Report received in PCT Application No. PCT/US2019/028616, mailed Aug. 1, 2019.

Extended European Search Report dated Jan. 17, 2022 issued in Counterpart EP Application No. 19802861.5.

Ambrus, et al., "A Novel Probabilistic Rig Based Drilling Optimization Index to Improve Drilling Performance," Society of Petroleum Engineers, SPE-186166-MS, Sep. 2017, Retrieved from the Internet: URL: http://onepetro.org/SPEOE/proceedings-pdf/17OE/1-17OE/D011S001R002/1312825/spe-186166-ms.pdf/1 [retrieved on Jun. 1, 2021.

Extended European Search Report dated Dec. 21, 2021 issued in EP Application No. 19792822.9.

Extended European Search Report dated Jun. 17, 2021 issued in EP Application No. 18868403.9.

* cited by examiner

700

USER INTERFACE 710

MEMORY
704

OPTIMIZATION
MODULE
712

PROCESSOR ELEMENT
702

NETWORK COMMUNICATION
UNIT 708

INTELLIGENT MONITORING FOR DRILLING PROCESS AUTOMATION

BACKGROUND ART

Embodiments described herein generally relate to automated drilling, and more specifically to optimizing performance of an automated control system for drilling.

Oilfield operations may be performed to locate and gather valuable downhole fluids. Oil rigs are positioned at wellsites, and downhole tools, such as drilling tools and other components, are deployed into the ground to reach subsurface reservoirs. Traditionally, human operators will need to press dozens of buttons in order to operate rig equipment to complete the drilling process. In addition, although a human operator may be relying on feedback provided by the downhole tools, drilling operations controlled by human operation may lack consistency, or may be subject to human error. Further, while some drilling applications allow for a software-based management of drilling operations, they often require the application developer to be keenly aware of the particulars of a rig, such as specific tools, and language needed to drive those tools. Thus, an automated control system for drilling is preferred. However, an automated control system may be slow compared to manual operation of the drilling rig. A method of optimizing an automated control system is needed.

DESCRIPTION OF EMBODIMENTS

Figure 1:
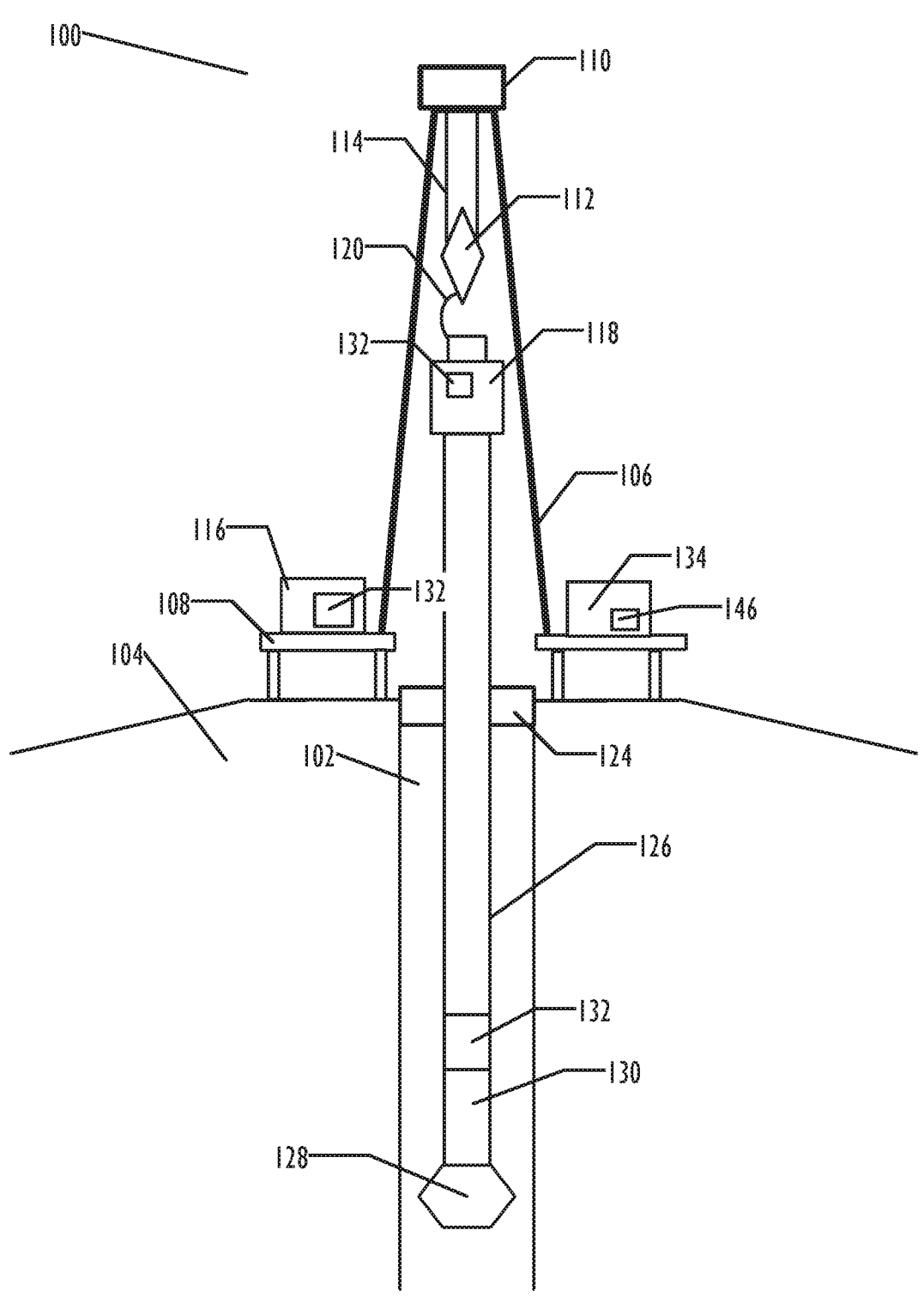
FIG. 1 is a diagram illustrating an apparatus for performing automated drilling operations utilizing a drilling rig software system.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of automated drilling having the benefit of this disclosure.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

As used herein, the term "drilling rig" can refer to a land or offshore rig apparatus utilized to drill a borehole.

As used herein, the term "drilling tool" can refer to drilling components such as drilling devices or sensors utilized to perform drilling activities.

According to one or more embodiments, the performance of an automated control system for drilling may be optimized utilizing intelligent event-driven actions. In one or more embodiments, an optimization module may monitor sensor data during a drilling process. In one or more embodiments, a drilling process may initially be deployed at a well site using default drilling parameters. In one or more embodiments, the drilling process may include several event-based drilling activities, and may be serialized drilling activities. That is, the automated control system may monitor drilling data during a first drilling activity to determine when to trigger the deployment of a second drilling activity based on the drilling parameters and the monitored data. The drilling process may employ drilling tools to complete the process. Some or all of the drilling tools may include sensors which may be utilized to obtain sensor data, which may be used to determine properties of the drilling process or a status of the drilling process. As an example, the sensor data may be monitored to determine when to trigger a next drilling activity.

In one or more embodiments, the historic data captured, for example from the sensors, during the drilling process may be stored in a user-specific storage. For example, the data may be securely stored locally or remotely such that the data is specifically accessible to a particular user account. The historic data may be analyzed to detect a trigger signature from the signal data which may provide a more accurate trigger for a next drilling activity. Said another way, instead of waiting for an action trigger from a predetermined trigger parameter, the trigger signature may be used to trigger a next drilling activity.

In one or more embodiments, the trigger signature may be determined by training an adaptive model using the historic data. In one or more embodiment, a user may provide the adaptive model with user-specific data. Further, in one or more embodiment, a trained model may be associated with other properties. For example, the trained model may be well-specific, formation-specific, geographic area-specific, or the like. In one or more embodiments, the adaptive model may additionally be enriched by incorporating data regarding the drilling tools. For example, characteristics of the tools, such as wear and tear, may be monitored and taken into consideration when generating and training the adaptive model. As an example, a level of wear of a tool may predictively slow a particular drilling process. Thus, in one or more embodiments, the adaptive model may be trained based on drilling tool characteristics, as well as historic data from prior drilling processes. In one or more embodiments, the optimization module may obtain drilling tool characteristics from a provider of the rig, and may obtain the historic data from an operator of the rig. Thus, the historic drilling data and the tool characteristics may be controlled and provided by two different parties. In addition, the optimizing module that trains the adaptive module may be controlled or provided by either the rig provider, the rig operator, or a third party, according to one or more embodiments.

In one embodiment of the invention, as illustrated in FIG. 1, an apparatus 100 for automated drilling of a borehole 102 in a subsurface formation 104 includes a derrick 106 on a rig floor 108. A crown block 110 is mounted at the top of the derrick 106, and a traveling block 112 hangs from the crown block 110 by means of a cable or drilling line 114. One end of the cable or drilling line 114 is connected to drawworks 116, which is a reeling device operable to adjust the length of the cable or drilling line 114 so that the traveling block 112 moves up and down the derrick 106. A top drive 118 is supported on a hook 120 attached to the bottom of the traveling block 112. The top drive 118 is coupled to the top of a drill string, which extends through a wellhead 124 into the borehole 102 below the rig floor 108. The top drive 118 is used to rotate the drill string inside the borehole 102 as the borehole 102 is being drilled in the subsurface formation 104. A bottomhole assembly 126 is provided at the bottom of the drill string. The bottomhole assembly 126 includes a bit 128 and a downhole motor 130 and may include other components not specifically identified but known in the art, e.g., a sensor package.

Although not shown, the automated drilling apparatus 100 includes a mud tank, which contains drilling fluid or "mud," a mud pump for transferring the drilling fluid to a mud hose, and a mud treatment system for cleaning the drilling fluid when it is laden with subsurface formation cuttings. The mud hose, in use, would be fluidly connected to the drill string so that the drilling fluid can be pumped from the mud tank into the drill string. The drilling fluid would be returned to the mud treatment system via a return path between the borehole and the drill string or inside the drill string, i.e., if the drill string is a dual-bore drill string. After the drilling fluid is cleaned in the mud treatment system, the clean drilling fluid would be returned to the mud tank.

In one embodiment of the invention, the automated drilling apparatus 100 includes sensors (or instruments) 132 for measuring drilling data. A variety of drilling data may be measured by the sensors 132. The locations of the sensors in the automated drilling apparatus 100 and the types of sensors 132 will be determined by the drilling data to be measured by the sensors 132. Examples of drilling data that may be measured by the sensors 132 include, but are not limited to, weight on bit, bit or drill string rotational speed, drill string rotational torque, rate of penetration, bit diameter, and drilling fluid flow rate. Measuring of drilling data may be direct or indirect. In the indirect measurement, the desired drilling data may be derived from other measurable drilling data. The drilling data may be measured at the surface and/or in the borehole. For example, drill string rotational torque may be measured at the surface using a sensor 132 on the top drive 118. Alternatively, pressure differential across the downhole motor 130 may be measured using a sensor 132 downhole. In another example, the load on hook 120 may be measured using any suitable means at the surface, and weight on bit may be inferred from the hook load. Various other drilling data not specifically mentioned above may be measured, or derived, as required by the drilling process.

In one embodiment, the drilling apparatus 100 includes one or more rig computing systems, such as rig computing system 134. In one embodiment, the rig computing system 134 includes various computing components and peripherals, such as a processor, memory, a display, a communications interface, and an input interface. The rig computing system 134 can receive measurement of drilling data from the various sensors 132 of the automated drilling apparatus 100. Information related to operation of the rig computing system 134 may be stored in some other computer-readable media 146 for subsequent loading into memory. Although the rig computing system 134 is shown primarily at the surface in FIG. 1, it should be noted that in other embodiments of the invention a portion or all of the rig computing system 134 may be located downhole.

Figure 2:
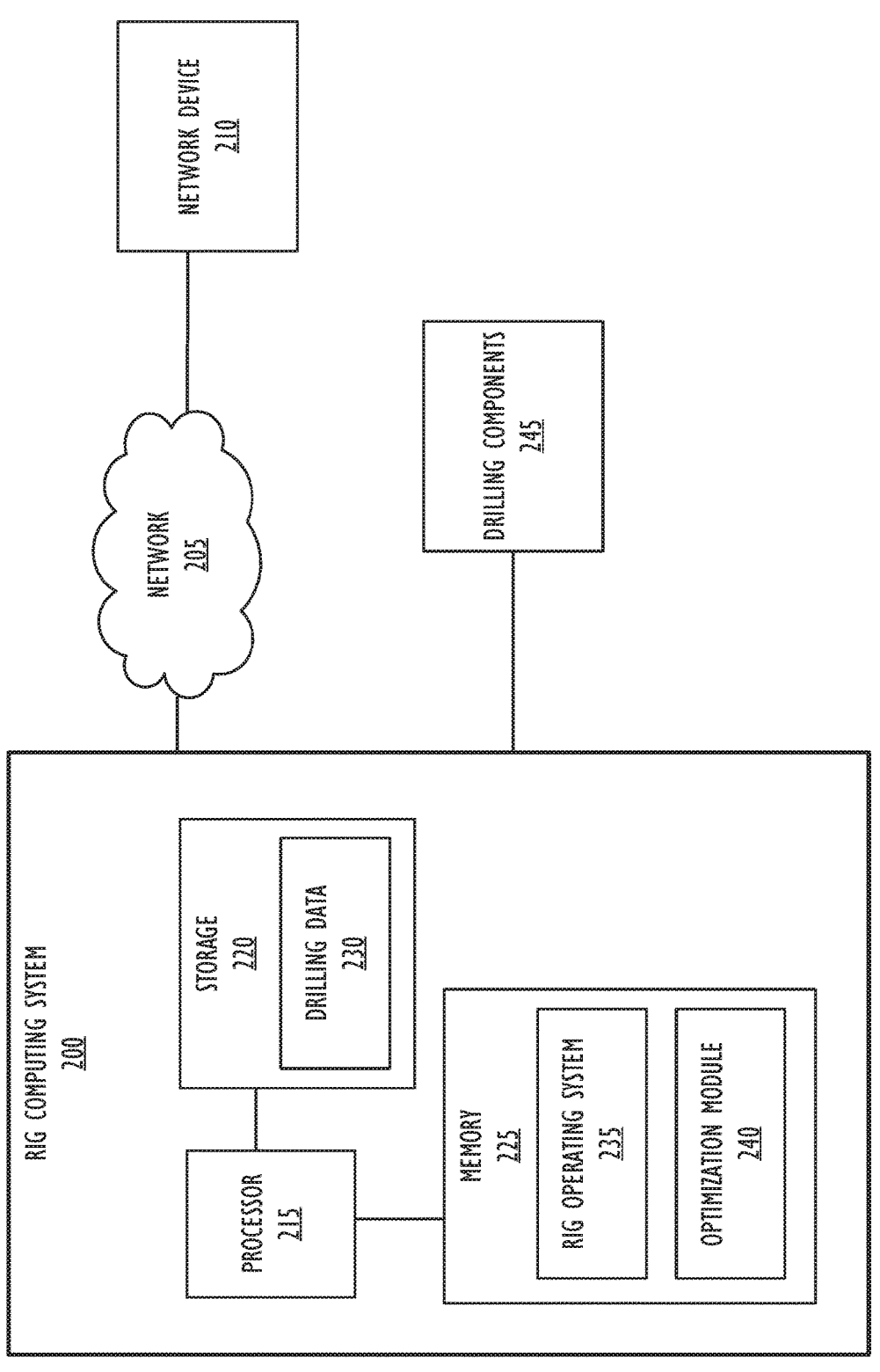
FIG. 2 is a system diagram illustrating a drilling rig software system for automated drilling, including an optimization module.

FIG. 2 depicts a system diagram illustrating a drilling rig software system for automated drilling. FIG. 2 includes a rig computing system 200 connected to one or more network devices 210 across a network 205. Rig computing system 200 may be, for example, a detailed version of rig computing system 134 of FIG. 1. Network device 210 may include any kind of device accessible across network 205, with which rig computing system 200 may communicate. For example, network device 210 may be an additional rig computing system, a server, a remote computer, or the like. Network 205 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Network 205 may be connected to gateways and routers, servers, and end user computers.

According to one or more embodiments, rig computing system 200 may include, for example, a storage 220, a memory 225 and processor 215. Processor 215 may include a single processor or multiple processors. Further, in one or more embodiment, processor 215 may include different kinds of processors, such as a central processing unit ("CPU") and a graphics processing unit ("GPU"). Memory 225 may include a number of software or firmware modules executable by processor 215. Memory 225 may include a single memory device or multiple memory devices. As depicted, memory 225 may include a rig operating system 235 and optimization module 240. The rig operating system 235 may be a process automation platform that manages rig equipment to execute optimization module 240's generation and training of an adaptive model. In one or more embodiment, the rig operating system 235 may receive instructions from the optimization module 240 and coordinate the instructions with the drilling components 245 to implement the well plan. The well plan may include a set of event-driven drilling activities that make up one or more drilling processes. In one or more embodiments, the optimization module 240 may be utilized to optimize the drilling processes.

In one or more embodiments, the optimization module 240 may monitor and manage drilling activities in order to deploy a well plan. The drilling activities may include event-driven activities, such that the rig operating system 235 may utilize data generated and/or received from the optimization module 240 to monitor drilling data for events that trigger a next drilling activities in the drilling process. The rig operating system 235 may initially utilize default or provided drilling parameters in order to deploy the various drilling activities in a drilling process. While the drilling activities are performed, the optimization module 240 may monitor drilling data, such as data from sensors of drilling components 245. The optimization module 240 may utilize the drilling data to identify trigger signatures which may better identify an event that triggers a next drilling activity in a drilling process.

According to one or more embodiments, the optimization module 240 may manage performance of the rig by tracking actions directed by the rig computing system 200, and responses by the system. As an example, if the rig computing system 200 directs a change in RPMs, a detected change in torque would be expected. Similarly, a change in flow would result in an expected change in pressure. According to one or more embodiments, the change in torque or pressure may be monitored by sensor data from drilling components 245 implementing the well plan, such as the top drive. The signal data from the sensors may be analyzed in order to identify a trigger signature that indicates a particular drilling activity should be initiated. In one or more embodiments, the analysis may be performed by the optimization module 240 utilizing a machine-learning algorithm which considers the monitored sensor data, as well as the well plan or otherwise directed instructions. The result is that the optimization module 240 may generate an adaptive model which identifies trigger signatures that may be more accurate in deploying a well plan that utilizing default drilling parameters, such as thresholds. As an example, a default drilling parameter may indicate that a motor stall is detected if, in part, a torque measurement increases at a particularly aggressive rate, or if the torque measurements satisfies a threshold. According to one or more embodiments, the optimization module 240 may determine a trigger signature based in part on a particular pattern in the sensor data during a particular time. Thus, for example, if the sensor data from the top drive never indicates that the torque satisfies a threshold measurement or acceleration, then the motor stall may not be detected, whereas by identifying a trigger signature in the top drive sensor data, a particular signature in the signal data may better identify a potential motor stall, thus allowing the system to employ mitigating or corrective action.

The optimization module 240 may receive the data through the rig operating system 235, or may be part of the rig operating system 235. In one or more embodiments, optimization module 240 may determine a trigger signature based on historic drilling data for a particular well, type of well, customer, or the like. Historic drilling data may be stored, for example, in storage 220 as part of drilling data 230. By analyzing historic drilling data, the optimization module may determine an expected signature for a particular trigger, as discussed above. Historic and current drilling data may be stored locally in storage 220 as drilling data 230. Alternatively, or additionally, drilling data and historic data may be stored in network storage, such as network device 210 across network 205. Although the various components are depicted within a single computing device rig computing system 200, in one or more embodiments, the various components and functionalities described with respect to the rig computing system 200 may instead be reconfigured in a different combination, or may be distributed among multiple computing devices.

Figure 3:
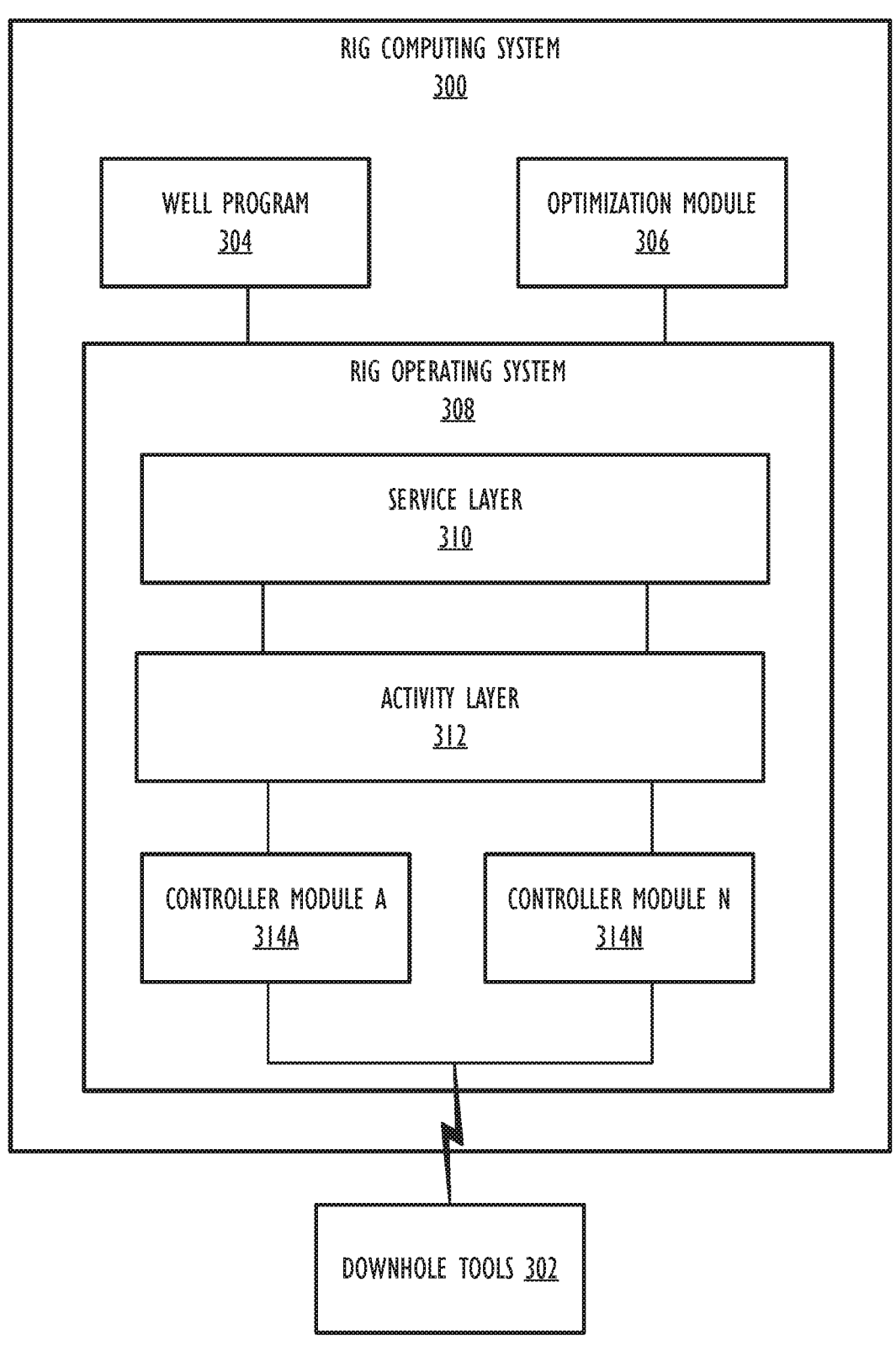
FIG. 3 is a flow diagram illustrating components of a rig computing system.

Turning to FIG. 3, a flow diagram illustrating components of a rig computing system. Specifically, FIG. 3 provides a schematic of an example data flow within the rig computing system 300. The rig computing system 300 may include optimization module 306, and a rig operating system 308. In addition, the rig computing system 300 may include a well program 304, which may facilitate management of the rig. The rig operating system may include several layers in which data flows. The rig operating system 308 may receive instructions from the optimization module 306. The optimization module 306 may provide tool-agnostic instructions. That is, optimization module 306 may be written for generic drilling components, and the rig operating system 308 may translate the tool-agnostic instructions into tool-specific instructions, to direct the specific downhole tools 302 accessible by the rig computing system 300. In one or more embodiments, multiple drilling applications, such has well program 304 and optimization module 306 may be utilized during drilling. The drilling applications may be managed by different entities, such as unique operators, contractors, owners, and the like. Thus, a first activity for a sub-process may be directed by a first application and managed by a first entity, whereas a second activity for the sub-process may be directed by a second application managed by a second entity. According to one or more embodiments, the rig computing system may toggle between utilizing the various drilling applications. Further, in one or more embodiment, drilling data generated while a particular entity is controlling an activity may be partitioned into a separate storage from drilling data generated while another entity is controlling an activity. The separate storage may be, for example, a separate physical storage device, a storage partition in a physical storage device, or a different data structure on a storage device. Thus, ownership of an activity may be managed for example, based on depth, formation, or section of a well plan.

The rig operating system 308 may include multiple components or layers that are utilized to translate tool-agnostic well plans into tool-specific instructions to direct downhole tools 302 to implement the well plan. In one or more embodiments, the rig operating system 308 may include a service layer 310, an activity layer 312, and a set of controller modules 314. In one or more embodiments, the service layer 310 may coordinate with a tool-agnostic request to an activity layer. The service layer may identify one or more activities required to complete a requested service or sub-process. As an example, the service layer 310 may receive instructions from a drilling application with instructions to perform a drill function to a particular depth, or in a particular formation. The service layer 310 may manage the activities needed to perform the different sub-process functions required to achieve the objective from a current drilling state. In one or more embodiments, the service layer 310 may switch between processes or objectives manually based on user input, or dynamically based on a predefined well plan or other instructions provided by an optimization module 306 or well program 304. Further, in one or more embodiments, the process may be dynamically modified based on a model or algorithm input. For example, the service layer 310 may switch the process objective from drilling to tripping or to reaming based on the input.

The service layer 310 may coordinate with the activity layer 312 to manage the various activities required to complete the requested sub-process or service. The activity layer may coordinate with one or more controller modules 314 to implement a particular activity. As an example, the activity layer 312 may identify various controller modules required to implement an activity as directed by the service layer 310. Further, according to one or more embodiments, the activity layer 312 may determine whether one or more controller modules 314 are available for performing a necessary activity. In one or more embodiments, if a controller module 314 is not available, then the activity layer 312 may trigger a notification such that the particular activity may be driven by a user.

According to one or more embodiments, the controller modules 314 act as an abstraction layer that allows optimization module 306 to be tool-agnostic, and controller module 314 to translate the instructions for specific downhole tools 302 or other drilling components. In one or more embodiments, controller modules 314 may include state machine logic to start and stop downhole tools 302 and other components, and bridge the process to the machine. The controller modules 314 may translate tool-agnostic instructions into tool-specific instructions based on the specific downhole tools 302 or other components available on a rig, thereby driving the tools. In one or more embodiments, the controller modules 314 may be tool-specific. That is, a controller module may be associated with a particular tool or tools such that the controller module generates tool-specific instructions for that particular tool. Further, in one or more embodiments, the controller modules 314 may be associated with multiple tools or components, or may be associated with a particular function of a particular tool. As an example, the top drive 118 may be utilized for sub-processes or activities such as circulation, rotation, and pipe handling. Each of circulation, rotation, and pipe handling may be managed by a separate controller module 314. The controller module 314 associated with a particular tool may drive that tool to implement actions to perform the activity. Further, according to one or more embodiments, controller modules 314 may be associated with particular functionality. For example, one or more controller modules 314 may be associated with rotation, whereas another one or more controller modules 314 may be associated with circulation. In this example, each controller module 314 may be associated with a particular set of drilling components based on functionality, and may include the capability to translate tool-agnostic instructions into tool-specific instructions for tools associated with the particular functionality.

According to one or more embodiments, the service layer 310 may manage the scheduling of the various sub-processes by the activity layer 312 and the controller modules 314. For example, the service layer may determine a current drilling state and, based on the drilling state, trigger the activity layer 312, and thus the controller modules 314 to perform an action. For example, if the objective is to drill, the controller modules 314 may initiate pumps to prepare for a particular flow, initiate a top drive for a particular circulation, and the like.

In addition, the service layer 310 may manage the optimization module 306 from which instructions are received. The service layer 310 may toggle between reference performance indexes used in optimization module 306 based on a drilling state. A drilling state may be determined based on sensor data from sensors 132. The drilling state may include contextual data either from or determined by the sensors 132, or environmental contextual data, such as drilling depth. For example, a first reference performance index may be used in optimization module 306 until the drilling operation reaches a particular depth, at which point a second reference performance index may be used in optimization module 306 instead. Thus, the service layer 310 may monitor a current depth or other drilling state information, and toggle between the various reference performance indexes in use in optimization module 306 accordingly.

Further, in one or more embodiments, the well program 304 may monitor various drilling measurements to ensure that the various drilling components perform within certain thresholds. As an example, thresholds may determine safe operation of the components, or may be utilized for resource management, such as power savings, or to limit wear and tear on machinery. According to one or more embodiments, the thresholds may be set by the well program 304 or optimization module 306. The thresholds may be set based on various drilling parameters, such as drilling state (i.e., a current activity, a current depth, or other contextual information). In one or more embodiments, when a threshold is exceeded, the well program 304 may modify the sub-process or activity directed by optimization module 306 such that the drilling parameter remains within a threshold.

Figure 4:
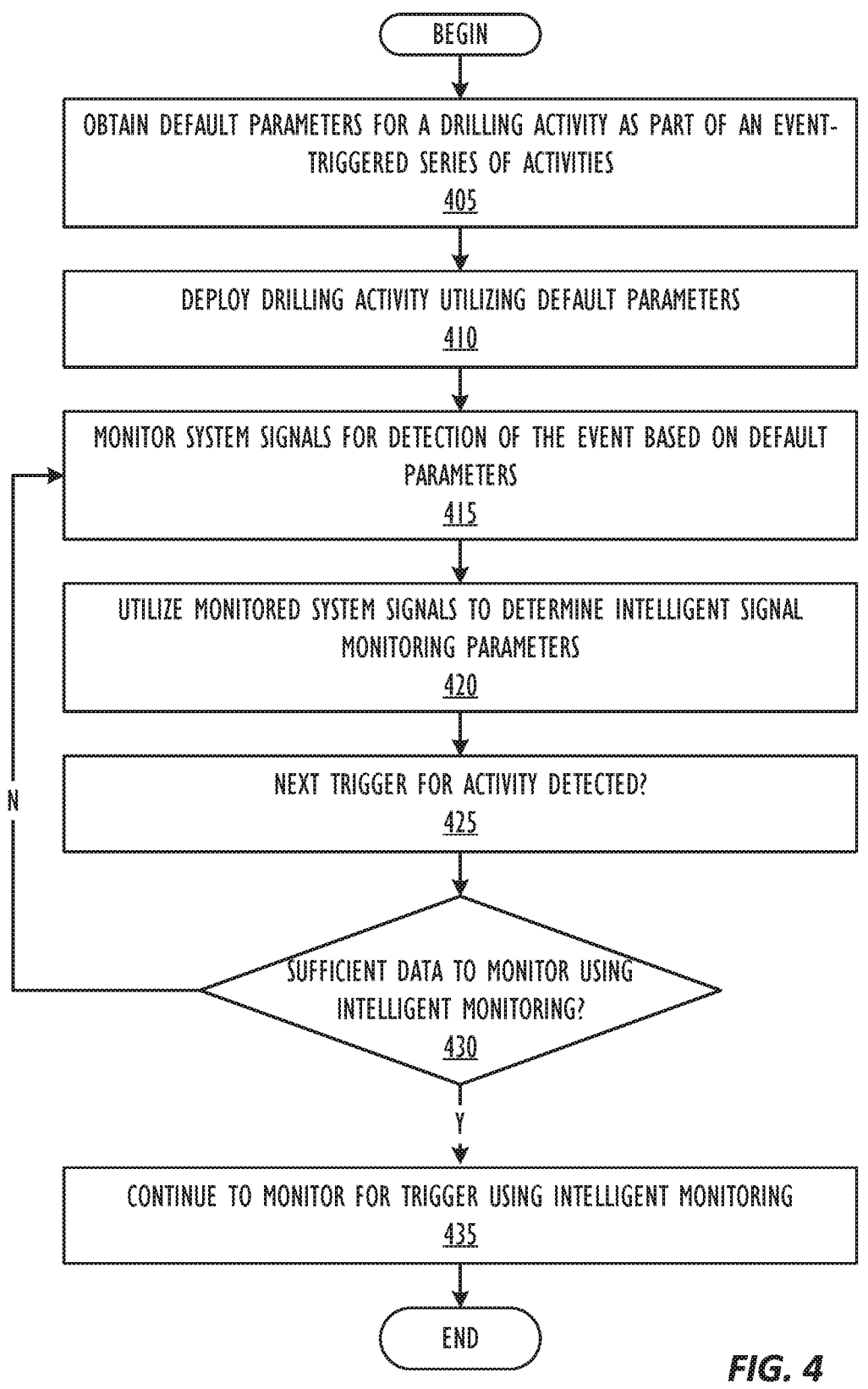
FIG. 4 is a flowchart illustrating utilizing intelligent monitoring for drilling activities.

FIG. 4 is a flowchart illustrating utilizing intelligent monitoring for drilling activities. According to one or more embodiments, the rig computing system 200 may utilize machine learning to better identify event triggers which may determine when a particular action should be deployed.

The flowchart begins at 405, and default parameters for a drilling activity are obtained. The drilling activity may be part of an event-driven series of activities that make up a drilling process. The default parameters may indicate an event at which a drilling activity is complete and/or a next action should be deployed. Drilling activities may include, for example, flow ramping, rotation ramping, tag bottom, off bottom, and friction test. Each of these activities may be associated with one or more parameters that may be used to determine a state of the drilling activity. As an example, stability SPP may be used to monitor a state of the flow ramping, and stability torque may be used to determine a state of rotation ramping. Some drilling activities may be monitored based on a combination of two or more drilling parameters. As an example, tag bottom may be monitored based on hook load and stand-pipe pressure ("SPP"). Each of these drilling parameters may be associated with values that indicate when a condition is met. In one or more embodiment, those values may be predetermined, such as default parameters within the rig operating system 235, or otherwise obtained by rig computing system 200 in association with the well plan. The flowchart continues at 410 where the drilling activity is deployed by the rig computing system 200 using default parameters.

At 415, the drilling optimization module 240 monitors system signals for detection of the event based on the default parameters. As described above, the various parameters may be measured from sensor is the corresponding drilling component utilized for the action. As an example, torque may be measured from signal data received from the top drive. When the torque reaches a certain threshold, it may indicate something about the drilling status, for example it may be used to identify a tag bottom event.

The flowchart continues at 420 and the drilling optimization module 240 utilizes the monitored system signals to determine intelligent signal monitoring parameters. According to one or more embodiments, the system signals may be read throughout the drilling process and plotted with historic data. In one or more embodiments, the historic data may be measured for each well and/or for each activity. Historic data may be plotted based on a time series in order to determine characteristics of the signal, or changes of the signal over time. Thus, various measurements may be made on the signal data to give more information about an expected behavior of the drilling process. Measurements may include, for example, mean or standard deviation of the signal readings in a series of time windows. In one or more embodiments, the combination of various signals may indicate a kind of trigger signature which may identify when an event has occurred that may drive an event-driven activity in the drilling process. In one or more embodiments, the intelligent signal monitoring parameters may be determined during the monitoring based on the default parameters. Alternatively, signal data may be stored for later analysis and determination of intelligent signal monitoring parameters. The determination may be performed by training an adaptive model with the data to identify the trigger signatures. That is, the model may be partially trained already, and the monitored data may be used to further train the model. In addition, the determination may be performed at the rig computing system 200 or remotely, such as by network device 210.

At 425, a next trigger for the next activity is detected and the process continues. In one or more embodiments, the next trigger may be detected based on the default parameters. In one or more embodiments, the flowchart continues at 430 where a determination is made regarding whether sufficient data to monitor using intelligent monitoring has been obtained. If a determination is made that sufficient data has not been obtained to monitor using intelligent monitoring, then the flowchart resumes at 415 and the rig computing system 200 continues to monitor the system using the default parameters. Determining whether sufficient data has been obtained may be based on determining whether monitored signal data, from a current well or drilling activity for example, is substantially similar to historical data for that well and/or drilling activity, or the like. Further, determining whether sufficient data has been obtained may include determining whether the adaptive model has been trained with sufficient data as to provide reliable results. If at 430, the determination is made that sufficient data has been obtained, then the flowchart concludes at 435, and the rig computing system 200 continues to monitor for triggers using intelligent monitoring.

Figure 5:
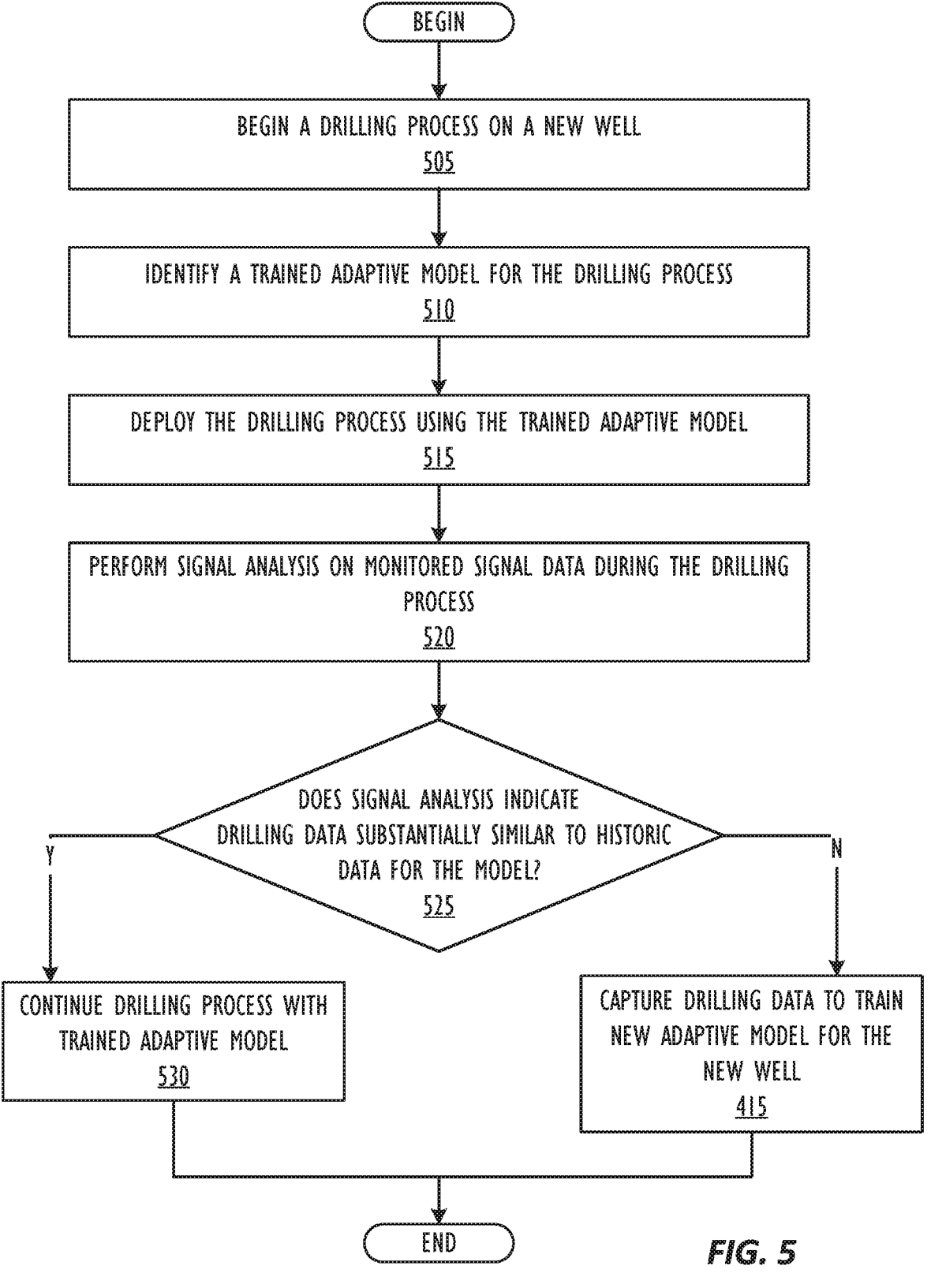
FIG. 5 is a flowchart illustrating an example method for optimizing performance of an automated drilling system, according to one or more embodiments.

FIG. 5 is a flowchart illustrating an example method for optimizing performance of an automated drilling system, according to one or more embodiments. Specifically, FIG. 5 describes in greater detail the use of an adaptive model for event-driven drilling processes.

The flowchart begins at 505 and a drilling process begins on a new well. In one or more embodiments, the drilling process may include a set or series of event-driven drilling activities. Said another way, one or more of the drilling activities may be deployed in response to the detection of a set of conditions, such as the predetermined parameters described above, or a trigger signature determined from an adaptive model.

At 510, a trained adaptive model for the drilling process is identified. In one or more embodiments, an adaptive model may be obtained that is specific to a particular user, such as an operator, utilizing the rig computing system 200 to implement the well plan. Further, in one or more embodiments, the adaptive model may be identified based on contextual conditions of the current well, such as knowledge about formation, geographic area, and the like. In one or more embodiments, the adaptive model may be obtained from storage 220, or network device 210. Further, the adaptive model may be provided by the rig computing system 200 without any well-specific data, or may be partially trained based on historic data.

The flowchart continues at 515 and the drilling process is deployed using the trained adaptive model. In one or more embodiments, the trained adaptive model may be used to detect trigger signatures to be used by the drilling process instead of relying on the default or provided parameters. At 520, the drilling optimization module 240 performs signal analysis on monitored signal data during the drilling process.

A determination is made at 525 regarding whether the signal analysis indicates drilling data is substantially similar to historic data for the model. If a determination is made that the signal analysis does indicate that the drilling data is substantially similar to historic data for the model, then the flowchart continues at 530 and the rig computing system 200 continues the drilling process with the trained adaptive model. Said another way, the optimization module 240 may determine that the monitored signal data is sufficiently similar to the historic data used to train the model to rely on results from the trained adaptive model.

Returning to 525, if a determination is made that the signal analysis indicates that the drilling data is not substantially similar to historic data for the model, then the flowchart concludes at 415 where the rig computing system 200 captures drilling data to train a new adaptive mode for the new well. For example, the monitored data may not be sufficiently similar if the formation is different than the formation detected during historic drilling processes utilized to train the model.

In one or more embodiments, the adaptive learning model may manage a global model that incorporates data from many sources. Further, the adaptive learning model may be specific to a user, and may be controlled by the user. Thus, in one embodiment, a rig provider may provide the basic model, and the operator may train the model with the operator's own data. Further, other variations of specific models may be trained. For example, well-specific models, well path-specific models, formation specific models, geographic area-specific models, and the like may provide targeted adaptive models for various situations.

Figure 6:
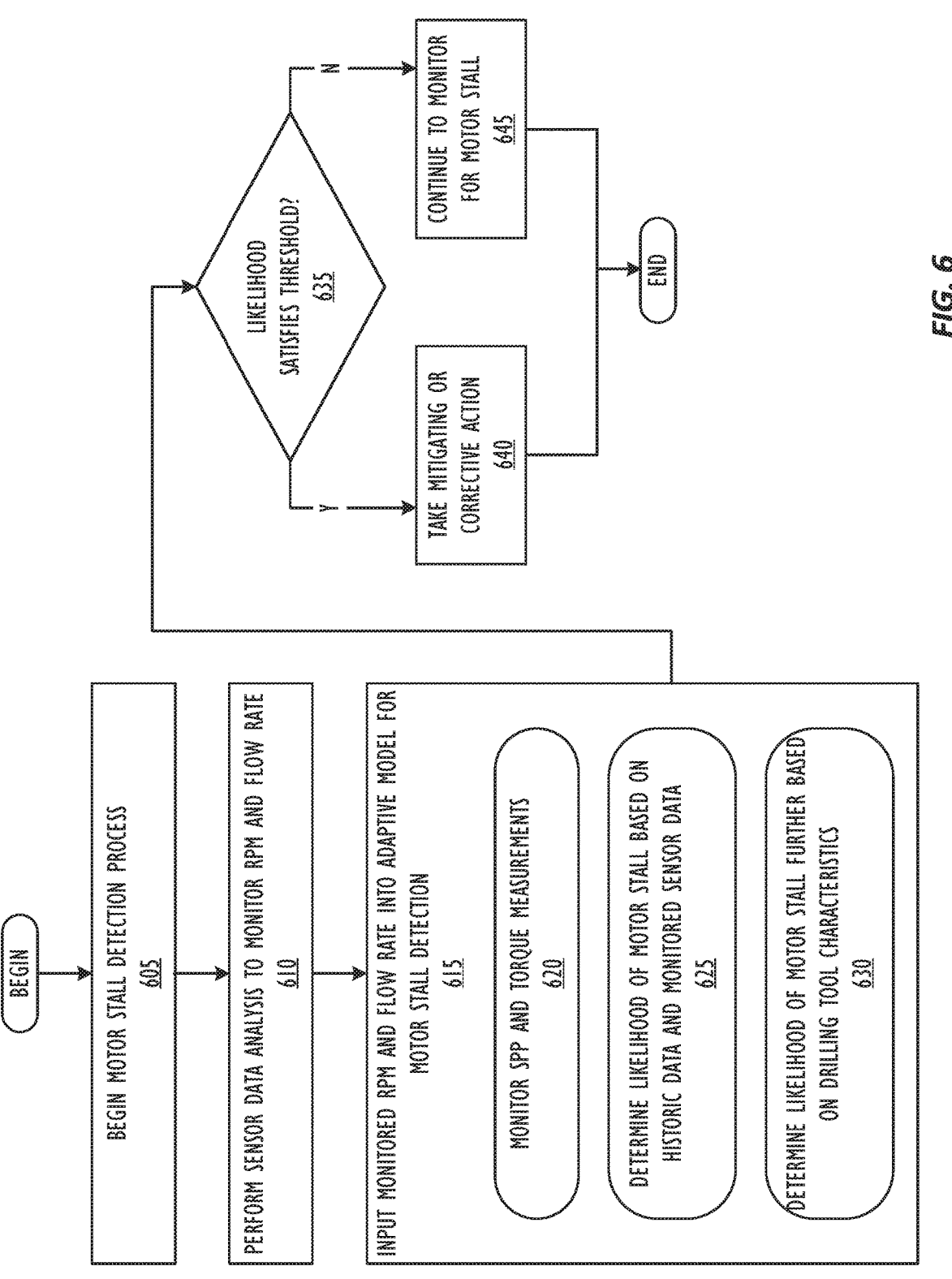
FIG. 6 is a flowchart illustrating another example method for optimizing performance of an automated drilling system, according to one or more embodiments.

FIG. 6 is a flowchart illustrating another example method for optimizing performance of an automated drilling system, according to one or more embodiments. Specifically, FIG. 6 depicts a flowchart for detecting a motor stall using intelligent monitoring. Generally, according to one or more embodiments, detecting a motor stall includes monitoring for an aggressive increase in torque and SPP when RPMs and flow are stable.

The flowchart begins at 605 and the motor stall detection process begins. In one or more embodiments, detecting a motor stall may include monitoring rotations per minute ("RPM") from a top drive and flow rate from a mud pump.

In particular, the motor stall detection process may include monitoring the RPMs, the resulting torque, along with flow rate, and the resulting SPP, according to one or more embodiments.

The flowchart continues at 610 where sensor data analysis is performed to monitor RPM and flow rate. At 615, the monitored RPM and flow rate are input into an adaptive model for motor stall detection. According to one or more embodiments, the sensor data analysis includes inputting the sensor data into an adaptive trained model to determine a likelihood of a motor stall. In one or more embodiments, the trained model may have been trained with historic data from the same well or well path, from different wells by the same user, by similar wells or well paths, or the like. The adaptive model may utilize a neural net, a random forest, or any other machine learning configuration.

In one or more embodiments, the adaptive model may determine a likelihood of a motor stall, for example using a motor stall index. That is, the use of a motor stall index may be enriched by the use of the adaptive trained model.

In one or more embodiments, utilizing the adaptive model for motor stall detection may include, at 620, monitoring standpipe pressure ("SPP") and torque measurements. At 625, the likelihood of the motor stall may be determined based on historic data and the monitored sensor data. Further, at 630, the likelihood of a motor stall may be further based on drilling tool characteristics.

In one or more embodiments, the flowchart continues at 635 and a determination is made regarding whether the likelihood satisfies a threshold. If the likelihood does not satisfy a threshold, then the flowchart continues at 645 and the sensor data continues to be monitored for a detected motor stall.

Returning to 635, if a determination is made that that likelihood of a motor stall does satisfy a threshold, then the flowchart continues at 640, and a mitigating or corrective action is taken. In one or more embodiments, a motor stall index may be determined, and an operator may be provided with information regarding the likelihood from a motor stall. For example, a motor stall index may be calculated based on detected sensor data, and presented to the operator in the form of a range, such as 0-1, indicating a likelihood of a motor stall based on the adaptive model.

In one or more embodiments, a mitigating action may be taken. Mitigation includes both reactive mitigation and proactive mitigation. For reactive mitigation, the rig operating system 235 instructs drilling components 245 to change their behavior in order to reduce a current likelihood of a motor stall or a near motor stall from occurring or exacerbating. For instance, the rig operating system 235 may instruct an auto driller to turn off and the drawworks 135 to be hoisted. The rig operating system 235 then instructs the auto driller to turn on once the SPP decreases below a threshold. For proactive mitigation, the rig operating system 235 instructs drilling components 245 to change their behavior in order to reduce a future likelihood of a motor stall or near motor stall from occurring. For instance, the rig operating system 235 may incorporate contextual data regarding the motor stall into the adaptive model in order to better recognize the motor stall in a future similar context, such as a similar well path or similar formation.

In addition, corrective action may be performed. For instance, the rig operating system 235 generates a warning to be presented to an operator, such as an audio warning presented over speakers, a visual or textual warning displayed on a graphical user interface ("GUI") or the like. The rig operating system 235 may instruct the top drive to decrease its RPM to 0, and the mud pumps to decrease a flow rate.

Figure 7:
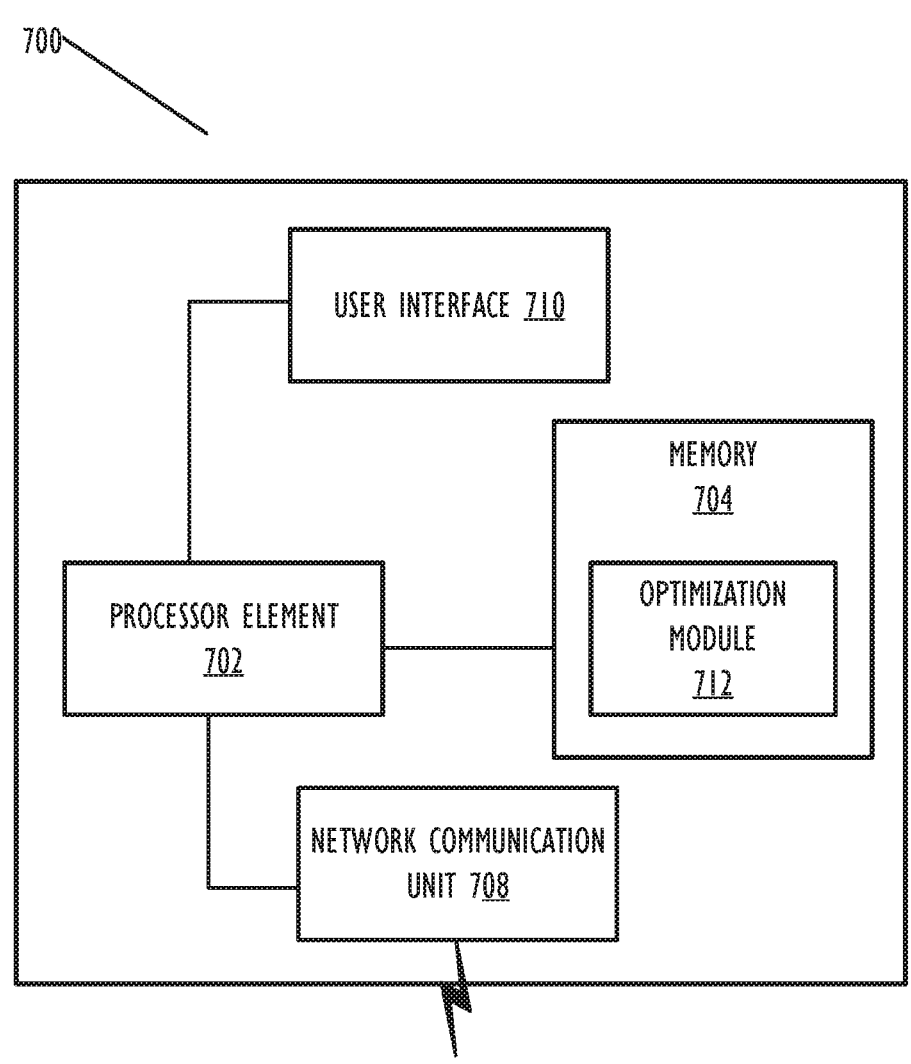
FIG. 7 is a block diagram illustrating a rig computing device for use with techniques described herein according to another embodiment.

FIG. 7 illustrates a particular computing device 700, that may be more example, a different view of rig computing device 200. Computing device 700 may include a memory 704 that may be operatively coupled to processing element 702. Memory 704 may be a non-transitory medium configured to store various types of data. For example, memory 704 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 702. In one embodiment, the compiling process of the software program may transform program code written in a programming language to another computer language such that the processing element 702 is able to execute the programming code. For example, the compiling process of the software program may generate an executable program that provides encoded instructions (e.g., machine code instructions) for processor 702 to accomplish specific, non-generic, particular computing functions.

After the compiling process, the encoded instructions may then be loaded as computer executable instructions or process steps to processing element 702 from storage (e.g., memory 704) and/or embedded within the processing element 702 (e.g., cache). Processing element 702 can execute the stored instructions or process steps, such as those related to optimization module 712, in order to perform instructions or process steps to transform the computing device into a non-generic, particular, specially programmed machine or apparatus. Stored data, e.g., data stored by a storage device, can be accessed by processing element 702 during the execution of computer executable instructions or process steps to instruct one or more components within the computing device 700.

A user interface 710 can include a display, positional input device (such as a mouse, touchpad, touchscreen, or the like), keyboard, or other forms of user input and output devices. The user interface 710 can be coupled to processor element 702. Other output devices that permit a user to program or otherwise use the computing device can be provided in addition to or as an alternative to network communication unit 708. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that computing device 700 may comprise other components well known in the art, such as sensors, powers sources, and/or analog-to-digital converters, not explicitly shown in FIG. 7.

The programmable devices depicted in FIG. 7 is a schematic illustration of embodiments of programmable devices which may be utilized to implement various embodiments discussed herein. Various components of the programmable devices depicted in FIG. 7 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. A non-transitory computer readable medium comprising computer readable code for optimizing performance of an automated control system for drilling, the computer readable code executable by one or more processors to:

obtain signal data from one or more sensors during a first instance of a first activity of a plurality of event-driven drilling activities performed by an operator, wherein the signal data is obtained during deployment of the plurality of event- driven drilling activities on a first well, and wherein a first instance of a second activity of the plurality of event-driven drilling activities is deployed in response to the signal data indicating a predetermined trigger parameter for the second activity is satisfied;

train an adaptive model on historic data to detect a trigger signature in the signal data, wherein the historic data comprises the signal data collected from the one or more sensors during the first instance of the first activity and prior to the deployment of the first instance of the second activity, and wherein the trigger signature indicates the second activity should be initiated;

monitor additional signal data during a second instance of the first activity;

determine the additional signal data does not indicate that the predetermined trigger parameter for the second activity is satisfied;

detect the trigger signature in the additional signal data;

deploy a second instance of the second activity in response to the trigger signature being detected in the additional signal data, wherein the computer readable code executable by the one or more processors to deploy the second instance of the second activity further comprises computer readable code executable by the one or more processors to: translate tool-agnostic instructions into tool-specific instructions based on specific downhole tools or other components available to the operator;

detect the trigger signature in second signal data obtained from a second well;

determine a difference between the trigger signature and a signal data pattern determined from signature analysis performed on the second signal data obtained during a second instance of the plurality of event-driven drilling activities on the second well; and in response to determining the difference satisfies a threshold, generate a second adaptive model for the second well based on the signal data pattern.

2. The non-transitory computer readable medium of claim 1, wherein the signal data is stored with the historic data.

3. The non-transitory computer readable medium of claim 1, wherein the signal data comprises at least one selected from the group consisting of rotations per minute, flow rate, stand-pipe pressure, and torque.

4. The non-transitory computer readable medium of claim 1, further comprising computer readable code to:

store the trigger signature and the signal data in a user-specific data store.

5. A system for optimizing performance of an automated control system for drilling, comprising:

one or more processors; and one or more computer readable media comprising computer readable code executable by the one or more processors to:

obtain signal data from one or more sensors during a first instance of a first activity of a plurality of event-driven drilling activities performed by an operator, wherein the signal data is obtained during deployment of the plurality of event-driven drilling activities on a first well, and wherein a first instance of a second activity of the plurality of event-driven drilling activities is deployed in response to the signal data indicating a predetermined trigger parameter for the second activity is satisfied;

train an adaptive model on historic data to detect-trigger signature in the signal data, wherein the historic data comprises the signal data collected from the one or more sensors during the first instance of the first activity and prior to the deployment of the first instance of the second activity, and wherein the trigger signature indicates the second activity should be initiated pattern;

monitor additional signal data during a second instance of the first activity;

determine the additional signal data does not indicate that the predetermined trigger parameter for the second activity is satisfied;

detect the trigger signature in the additional signal data;

deploy a second instance of the second activity in response to the trigger signature being detected in the additional signal data, wherein the computer readable code executable by the one or more processors to deploy the second instance of the second activity further comprises computer readable code executable by the one or more processors to: translate tool-agnostic instructions into tool-specific instructions based on specific downhole tools or other components available to the operator;

detect the trigger signature in second signal data obtained from a second well;

determine a difference between the trigger signature and a signal data pattern determined from signature analysis performed on the second signal data obtained during a second instance of the plurality of event-driven drilling activities on the second well; and in response to determining the difference satisfies a threshold, generate a second adaptive model for the second well based on the signal data pattern.

6. The system of claim 5, wherein the signal data is stored with the historic data.

7. The system of claim 5, wherein the signal data comprises at least one selected from the group consisting of rotations per minute, flow rate, stand-pipe pressure, and torque.

8. The system of claim 5, further comprising computer readable code to:

store the trigger signature and the signal data in a user-specific data store.

9. A method for optimizing performance of an automated control system for drilling, comprising:

obtaining signal data from one or more sensors during a first instance of a first activity of a plurality of event-driven drilling activities performed by an operator, wherein the signal data is obtained during deployment of the plurality of event-driven drilling activities on a first well, and wherein a first instance of a second activity of the plurality of event-driven drilling activities is deployed in response to the signal data indicating a predetermined trigger parameter for the second activity is satisfied;

training an adaptive model on historic data to detect a trigger signature in the signal data, wherein the historic data comprises the signal data collected from the one or more sensors during the first instance of the first activity and prior to the deployment of the first instance of the second activity, and wherein the trigger signature indicates the second activity should be initiated;

monitoring additional signal data during a second instance of the first activity;

determining the additional signal data does not indicate that the predetermined trigger parameter for the second activity is satisfied;

detecting the trigger signature in the additional signal data;

deploying a second instance of the second activity in response to the trigger signature being detected in the additional signal data, wherein deploying the second instance of the second activity further comprises translating tool-agnostic instructions into tool-specific instructions based on specific downhole tools or other components available to the operator;

detecting the trigger signature in second signal data obtained from a second well;

determining a difference between the trigger signature and a signal data pattern determined from signature analysis performed on the second signal data obtained during a second instance of the plurality of event-driven drilling activities on the second well; and in response to determining the difference satisfies a threshold, generating a second adaptive model for the second well based on the signal data pattern.

10. The method of claim 9, wherein the signal data is stored with the historic data.

11. The method of claim 9, wherein the signal data comprises at least one selected from the group consisting of rotations per minute, flow rate, stand-pipe pressure, and torque.

12. The method of claim 9, further comprising:

storing the trigger signature and the signal data in a user-specific data store.

13. The non-transitory computer readable medium of claim 1, wherein the adaptive model comprises at least some parameters derived from data sourced from the operator and at least some parameters derived from a global model that incorporates data from a plurality of sources.

14. The non-transitory computer readable medium of claim 1, wherein the second instance of the second activity is deployed according to a reference performance index that is based on a current depth or other drilling state information related to the second instance of the second activity.

15. The system of claim 5, wherein the adaptive model comprises at least some parameters derived from data sourced from the operator and at least some parameters derived from a global model that incorporates data from a plurality of sources.

16. The system of claim 5, wherein the second instance of the second activity is deployed according to a reference performance index that is based on a current depth or other drilling state information related to the second instance of the second activity.

17. The method of claim 9, wherein the adaptive model comprises at least some parameters derived from data sourced from the operator and at least some parameters derived from a global model that incorporates data from a plurality of sources.

18. The method of claim 9, wherein the second instance of the second activity is deployed according to a reference performance index that is based on current depth or other drilling state information related to the second instance of the second activity.

* * * * *